Sept. 17, 1963  P. NEGRONI  3,103,977
AERODYNAMIC SURFACES, AND PARTICULARLY HELICOPTER BLADES
Filed Nov. 21, 1961  3 Sheets-Sheet 1
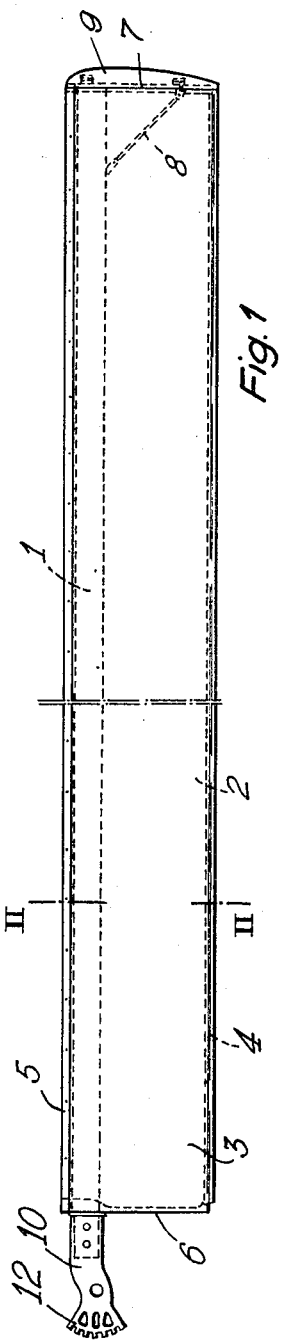
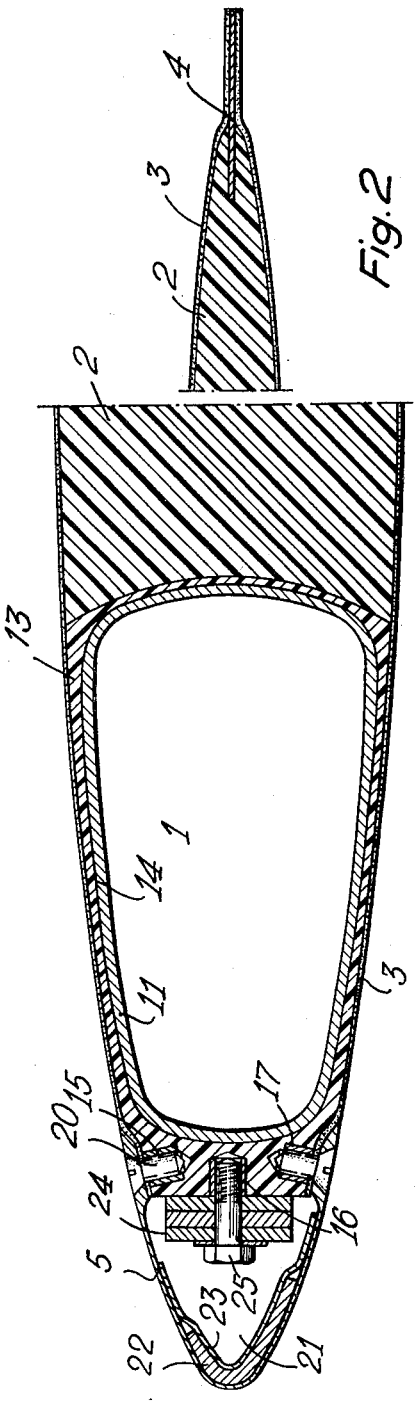

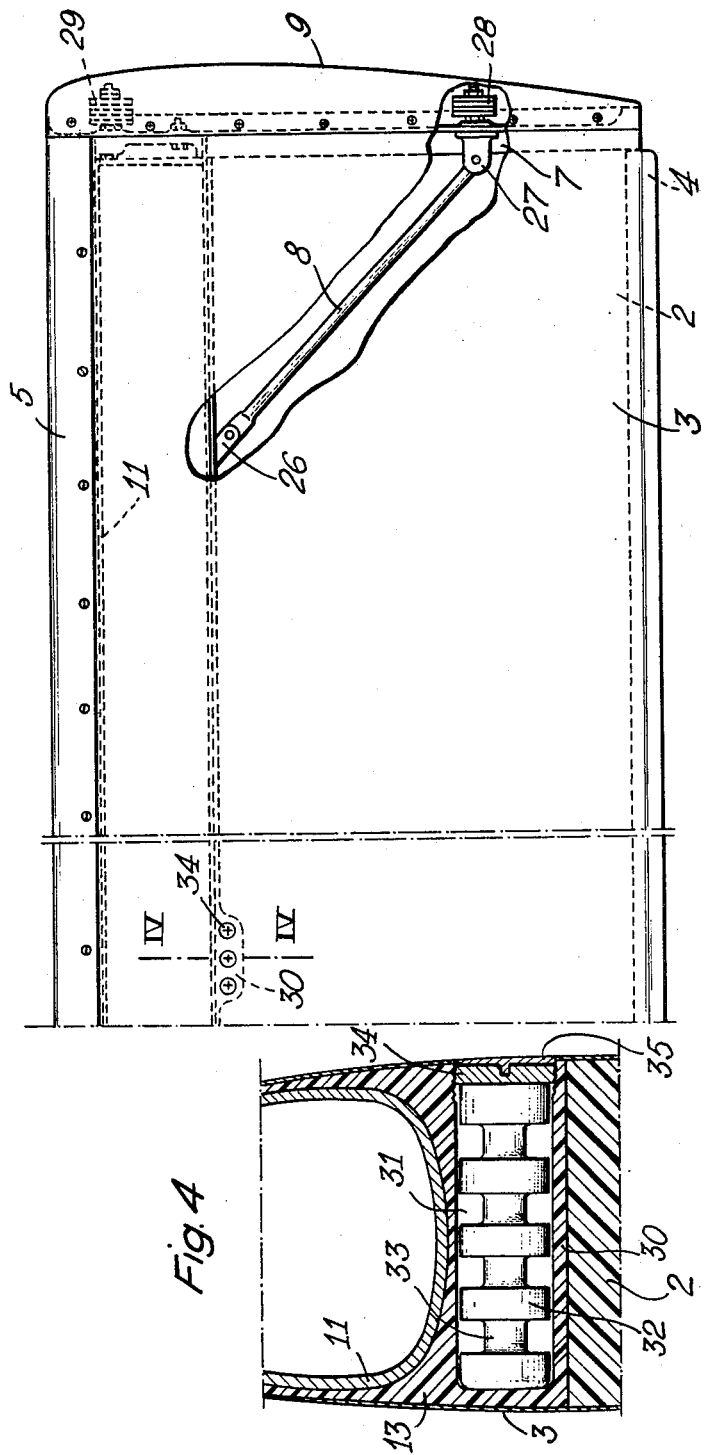

United States Patent Office 3,103,977
Patented Sept. 17, 1963

3,103,977
AERODYNAMIC SURFACES, AND PARTICU-
LARLY HELICOPTER BLADES
Pierre Negroni, Paris, France, assignor to Sud-Aviation
Societe Nationale de Constructions Aeronautiques,
Paris, France
Filed Nov. 21, 1961, Ser. No. 153,931
Claims priority, application France Nov. 30, 1960
2 Claims. (Cl. 170—159)

It is already known to manufacture an aerodynamic surface comprising a longitudinal tubular spar or beam of progressively decreasing thickness toward the tip, this spar having a circular-sectioned portion at its root, which merges after a short intermediate portion with another portion of torpedo-like cross-sectional profile extending to the tip of the airfoil, the structural shape of the airfoil being provided by a plurality of single or composite hollow elements of substantially streamlined shape, made of thin molded plastic material reinforced with glass fabric, these elements being secured at short intervals on the longitudinal beam and having their leading-edge portions covered by sheet metal protection elements disposed in overlapping relationship to the joints of the aforesaid hollow structural elements, the intervals between these hollow structural elements being filled by a resilient material of cellular or like structure.

On account of the increasing tonnage and size of present-day helicopters and of users' stringent requirements regarding the lasting qualities of such equipment, and with a view also to making ever desirable aerodynamic improvements, the present invention has for its object an aerodynamic surface comprising a tubular spar of substantially constant outer section, of progressively decreasing thickness towards the tip, and of substantially trapezoidal shape, made of alloy steel and wrapped in a mass of synthetic material, the structural shape of the aerodynamic surface shaping being provided by a single member of cellular structure secured to the rear of the wrapping and covered, like said wrapped spar, with a skin consisting of two thin sheets of laminated resin-glasscloth of substantially constant thickness having, inserted between them at the trailing edge, a reinforcing metal strip, the leading edge being constituted from a single hollow member demountably fitted to the front of said wrapped and skin-covered spar, the aforesaid hollow member being made of stainless steelplate and serving to accommodate de-icing elements, and balancing being insured by a set of counterweights arranged along the leading edge, by two further weights placed in the wing-tip fairing and by a further weight located to the rear of the spar.

Thus, by reason of the very shape of the spar, maximum advantage is taken of the depth of the airfoil section, and the evolutional circular-to-torpedo section of the spar in the known surfaces is replaced by a spar of substantially constant trapezoidal outer section, having a varying thickness which is preferably obtained by a chemical etching process.

The single member of cellular structure may consist either of some synthetic filler material of the foam type, such as the polyurethane foam known by the trade name "Moltoprene," or by a honeycomb structure made of metal or some other convenient material. This member extends between the two end ribs and is attached thereto and to the spar by bonding in cases where a synthetic foam is used. Chordwise balancing is achieved by means of the set of counterweights, while the extra weights enable manufacturing tolerances to be compensated for by effecting the final balancing operations on one blade at a time rather than on a full set of blades together.

The aerodynamic surface according to the invention possesses the following advantages, particularly in the case of helicopter blades:

(a) Minimum weight and maximum rigidity, by the use of a spar that occupies the full available height of the airfoil section;

(b) Accuracy of the airfoil section, insured by: finishing the blade twist by application of a synthetic material; using a mold-bonded skin;

(c) High aerodynamic quality of the finish obtained, due to the use of the laminated resin-glasscloth skin;

(d) Resistance to abrasion, by the use of a stainless steel leading edge that can additionally be disassembled and is consequently repairable;

(e) Reduced spar deformation, thereby enabling a continuous trailing edge to be substituted for the conventional type built up from separate sections;

(f) High ratio of spar modulus of elasticity to that of the remainder of the blade, resulting in low stressing of the plastic elements;

(g) Improved resistance to fatigue, so that the spar becomes the sole structural element governing the useful life of the blade.

With these and other objects in view which will become apparent in the following detailed description, the present invention will be clearly understood in connection with the accompanying drawings filed by way of example only and not of limitation and in which:

FIGURE 1 is a plan view of a helicopter blade according to the invention.

FIGURE 2 is a sectional view along the line II—II in FIGURE 1, with partial cutaway.

FIGURE 3 is a fragmentary partial cutaway view, on a larger scale, of the blade shown in FIGURE 1.

FIGURE 4 is a sectional view on a larger scale, through the line IV—IV in FIGURE 3.

Figure 5:
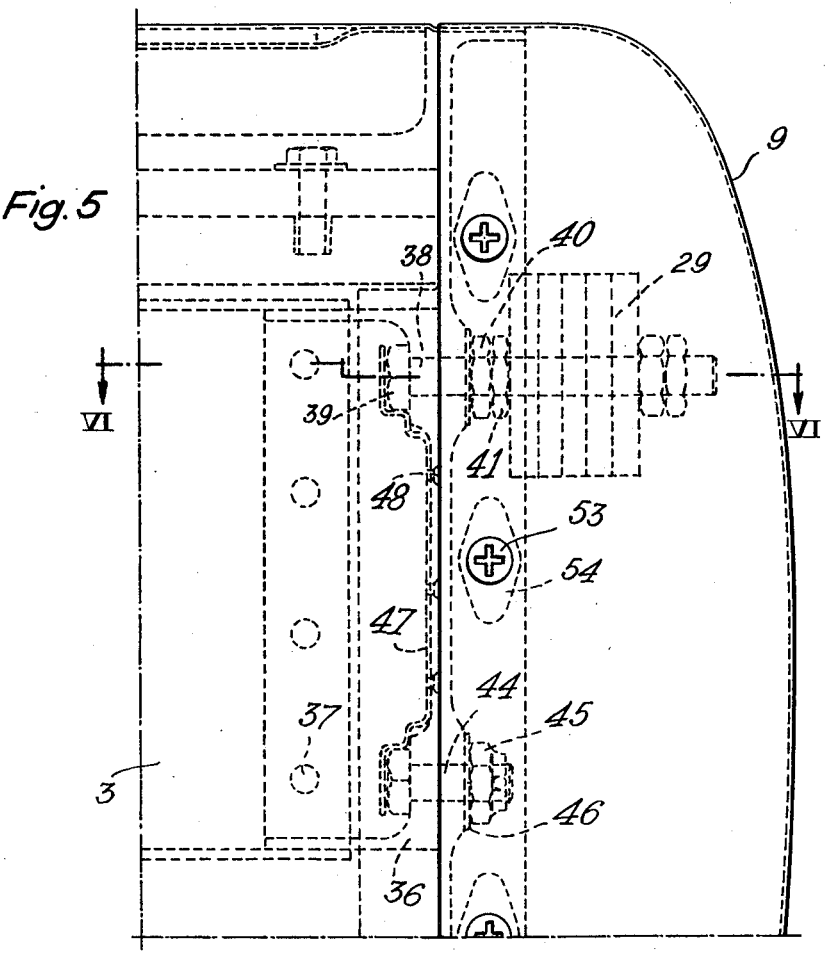
FIGURE 5 is a fragmentary external view, on a larger scale, of that part of the blade-tip and blade-tip fairing of the blade in FIGURE 1 which corresponds with the spar area.

Referring now to the drawings, the embodiment of a helicopter blade shown therein by way of example comprises a spar assembly 1 and a filler consisting of a single member 2 of cellular structure which provides the structural shape of the blade and which is attached to the spar assembly, the whole being covered with two thin sheets 3 of substantially constant thickness, with insertion therebetween, at the trailing edge, of a reinforcing metal strip 4. A leading edge element 5 is secured to the spar assembly 1. The whole structure is bounded spanwise by two ribs 6 and 7, the latter being joined through the medium of a bracing strut 8 to the spar assembly 1 and being fitted with a fairing 9. The said spar assembly is further equipped with a blade-root spigot fitting 10.

The spar assembly 1 (FIGURE 2) consists of an alloy steel tubular spar 11 of constant outer section, of progressively decreasing thickness towards the tip, and of substantially trapezoidal shape, in order to take maximum advantage of the height of the airfoil section. After undergoing local machining, this spar receives the blade-root fitting 10 which terminates in a toothed sector 12 used to conventionally control blade folding. The spar is furthermore wrapped in a mass of thermoplastic synthetic material 13 preferably belonging to the class of ethoxylines such as the one known under the registered trademark "Araldite." This wrapping is effected after providing the outer surface 14 of the spar with a special coating of laminated resin-glasscloth offering good clinging qualities. The wrapping is obtained by a molding process and insures the required degree of accuracy, its thickness being determined in terms of the thickness of the outer skin covering the blade. Within the body of the wrapping material 13 are embedded tapped metal elements 15, 16 and 17 the functions of which will be described hereinafter.

The filler providing the structural shape of the blade consists of a single member 2 of cellular structure made of ome synthetic foam such as the polyurethane foam known by the name "Moltoprene." This initially molded foam, the density of which is appropriately chosen beforehand, is bonded in mold to the Araldite wrapping 13. The assembly comprising the wrapped spar and the filler material is then covered, in the mold, by two sheets 3 of resin-glasscloth laminate between which, and gripped thereby, is a trailing edging-strip 4 embedded in the filler material forming member 2.

Into the tapped parts 15 and 17 is demountably fixed, by means of screws 20, the one-piece leading edge 5 made of some convenient stainless steelplate lightened by chemical etching, an example being an abrasion-proof stainless steel. The screws 20 are locked with Araldite. Inside the chamber 21 thus formed within the leading edge are housed electrical heating resistors 22 which may be used for de-icing, and these resistive elements are secured by a stainless steel plate 23 electrically welded to the inside of the leading edge 5. In the chamber 21 are additionally accommodated balancing counterweights 24 retained by screws 25 engaging into the tapped parts 16. The thus constructed blade assembly is provided externally with a damp-proof top coat.

As may be seen in FIGURES 3 and 4, the spar assembly at the blade-tip is joined to the rib 7 by a steel or light alloy strut or rod 8 cooperating with yoke attachments 26 and 27 on the spar and the rib respectively. The said attachments are made of steel or light alloy and are secured to the spar assembly and to the rib by bolting or welding. The attachment 27 also serves to secure the spanwise-balancing rear weight 28 housed within the blade-tip fairing 9. A spanwise-balancing front weight 29 is also housed within said faring 9 and is secured to the rib 7, as shown in detail in FIGURES 5 and 6. In addition, the wrapping 13 of the spar 11 is provided with a rearwardly directed projection 30 having therein three cylindrical housings 31 in which are accommodated weights each of which consists of a piece of steel or heavy metal made up of a series of cylindrical sections 32 of substantially the same diameter as the housing 31 and separated from one another by reduced sections 33. A pellet 34 is used to tightly seal each housing 31. An outer coating 35 covers the pellets to insure proper surface continuity and to secure the said pellets at the same time.

Figure 6:
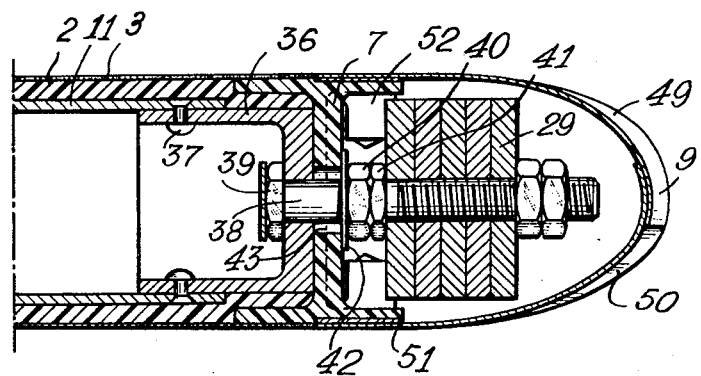
FIGURE 6 is a section through the line VI—VI of FIGURE 5.

As shown in FIGURES 5 and 6, the spar 11 is obturated at its outer extremity by a light alloy plug 36 secured thereto by means of rivets 37. The blade-tip rib 7, made of laminated resin-glasscloth or light alloy is secured to the plug 36 by a screw 38 the head 39 of which thrusts against the inside face of the plug. Fixing is insured by means of a nut 40 and a locknut 41 which tighten a washer 42 onto the rib. The said rib is provided with a bore 43 the diameter of which is greater than that of the screw 38, thereby providing a clearance whereby the rib may be properly located before being finally secured in position. An identical clearance is provided for securing the attachment 27 which supports the blade-tip fairing rear weight 28 (FIGURE 3). The rib 7 is furthermore fixed to the plug 36 by a screw 44 associated to a locked nut 45 and a washer 46. The screws 38 and 44 are retained by a light alloy plate 47 which is fixed to the plug by rivets 48. Onto the screw 38 is secured the adjustable front weight 29 made of steel or heavy alloy. The part of rib 7 in contacting engagement with the filler 2 may be bonded to said filler.

At the blade-root the rib corresponding to rib 7 may be secured in the same way to the spar and the filler.

The blade-tip fairing 9 is made up of two half-shells 49 and 50 of stainless steel, weldable light alloy or aminated resin-glasscloth, and said half-shells are welded or bronzewelded together. A reinforcement 51 is provided on each side of the blade-tip fairing, the assembly being secured to protruding portions 52 of the rib 7 by means of screws 53 and self-locking fixing plates 54.

In cases where a blade is to embody twist, the necessary spar twist is preferably obtained by torsion in the annealed state, the spar being subsequently rectified, if necessary, by elongation after hardening.

What I claim is:
1. In a helicopter blade having a single hollow metal spar of substantially constant outer section and of progressively decreasing thickness, filler material of lesser density than said spar and adherent thereto to provide an outer shape for the blade and a leading edge portion adapted for connection to the filler material, the improvement according to which the spar is substantially of trapezoidal shape and has longer sides extending in the chordwise direction of the blade, said spar extending for the greater part of the height of the blade at the front of the blade adjacent said leading edge portion.

2. In a helicopter blade having a metal spar, chordwise balancing counterweights disposed fore and aft of the metal spar, a filler material of lesser density than the spar for providing the structural shape of the blade, and a V-shaped element which constitutes a leading edge portion, an improvement comprising a metal strip on said filler material constituting an outer surface for the blade, a wrapping of synthetic thermoplastic material surrounding the spar and securing the latter in embedded relation therein, said wrapping having an outer contour corresponding to the metal strip for supporting the latter thereon, said wrapping including forwardly of the spar a front projection provided with cylindrical bores arranged parallel to the chord of the blade, said leading edge portion defining a hollow space with the wrapping which extends lengthwise of the blade, said wrapping including aft of said spar a rear projection provided with cylindrical chambers extending at right angles to said chord, internally threaded metal elements in said bores, the front chordwise balancing counterweights being housed in the space between said wrapping and the V-shaped leading edge portion, screws removably fitting said front counterweights in said internally threaded elements for allowing adjustment of front chordwise balancing, rear chordwise balancing counterweights removably inserted into said cylindrical chambers for allowing adjustment of rear chordwise balancing, each rear counterweight consisting of a cylindrical metal member having a plurality of circular lightening grooves, and removable sealing pellets which obturate said cylindrical chambers.

References Cited in the file of this patent
UNITED STATES PATENTS

| 1,969,781 | De La Cierva | Aug. 14, 1934 |
| 2,242,147 | Salisbury | May 13, 1941 |
| 2,451,541 | Doman | Oct. 19, 1948 |
| 2,580,363 | Schnitt | Dec. 25, 1951 |
| 2,619,305 | Enos | Nov. 25, 1952 |
| 2,620,884 | Gluhareff | Dec. 9, 1952 |
| 2,828,531 | Bath | Apr. 1, 1958 |

FOREIGN PATENTS

| 669,112 | Great Britain | Mar. 26, 1952 |
| 1,171,382 | France | Oct. 6, 1958 |